United States Patent Office 3,544,483
Patented Dec. 1, 1970

3,544,483
EUROPIUM ACTIVATED STRONTIUM MAGNESIUM ORTHOPHOSPHATE PHOSPHORS
Costas C. Lagos, Danvers, Mass., assignor to Sylvania Electric Products Inc., a corporation of Delaware
No Drawing. Filed Mar. 27, 1968, Ser. No. 716,369
Int. Cl. C09k 1/36
U.S. Cl. 252—301.4
3 Claims

ABSTRACT OF THE DISCLOSURE

Europium is a useful activator for strontium magnesium orthophosphate phosphors. In the preferred compositions, the phosphor emits in the deep blue region of the spectrum under ultraviolet excitation.

BACKGROUND OF THE INVENTION

Field of the invention

This invention relates to synthetic inorganic phosphors. More specifically, it relates to europium activated strontium magnesium orthophosphate phosphors for use in arc discharge devices, cathode ray tubes and the like.

DESCRIPTION OF THE PRIOR ART

The term phosphors—or more appropriately luminophors—is used broadly in the art to describe luminescent solids. However, a large number of synthetic inorganic phosphors have been developed and are known in the art. These synthetic inorganic phosphors comprise two essential ingredients; a "host" or "matrix" compound and an "activator." The better known host materials include silicates, phosphates, sulfides, selenides, the alkali halides and oxides of calcium, magnesium, barium, zinc and others. The activators most frequently employed are copper, silver, thallium, lead, manganese, cerium, chromium, titanium, antimony and tin. Only a minor amout of activator is generally required in the preparation of phosphors. Oftentimes amounts ranging from a few parts per million to several percent can confer luminescent properties on the host compounds. Synthetic inorganic phosphors are generally prepared by reacting well mixed, finely divided powders of the host and activator at high temperatures.

Luminescence of phosphors is presently considered to be primarily dependent on the ability of a substance to absorb the activating radiation. Accordingly, whether a given substance will function as a phosphor when exposed to a given source of activating radiation is virtually impossible to predict with any degree of certainty. For example, it is well known that many phosphors are luminescent only when exposed to ultraviolet light of a particular wavelength. Some, for example, are non-luminescent when exposed to ultraviolet light of one wavelength but are surprisingly strongly luminescent when exposed to a different wavelength in the ultraviolet region. Also, it is well known that a phosphor which is non-luminescent to ultraviolet light can unexpectedly manifest strong luminescence under X-ray radiation.

Synthetic inorganic phosphors are generally used in fluorescent lighting. However, some find specialized applications in cathode ray tubes used in both television and radar, for example. It is not deemed necessary to discuss in detail the manners, method or fashions in which phosphors are assembled or otherwise integrated with other components or structures necessary to accomplish a given application in which a phosphor is employed. These methods, manners and fashions are well known to those skilled in the art to which the present invention pertains. However, it will be apparent from the above discussion that the advancement of the synthetic inorganic phosphor art primarily depends upon and awaits the discovery of new synthetic inorganic phosphors. With the discovery of new phosphors, the present range of applications for phosphors can be expanded and new phosphors become available which can oftentimes be substituted for known phosphors to obtain improved performance in specific existing applications.

SUMMARY OF THE INVENTION

In accordance with the present invention, compositions of strontium, magnesium orthophosphate activated by europium are presented as new phosphors. Specifically, the new phosphors correspond to the following formula: $Sr_aMg_b(PO_4)_2:Eu_c^{+2}$ where $a$ is between about 0.25 and 1.75, $b$ is between about 1.25 and 2.75, the sum of $a$ and $b$ is between about 2.8 and 3.2 and $c$ is between about 0.0004 and 0.4. The preferred phosphors of the present invention emit in narrow band widths in the blue region of the spectrum when irradiated with either 2537 or 3650 A. excitation or when bombarded with electrons from a cathode ray tube.

DESCRIPTION OF THE PREFERRED EMBODIMENTS

Table I below, illustrates the distinct differences in emission for a preferred phosphor, $$Sr_{0.93}Mg_{2.06}(PO_4)_2:Eu_{0.1}^{+2}$$

as compared with other known phosphore. The data given in Table I are for measurements at 2537 A. excitation.

TABLE I

| Phosphor | Frequency at peak emission, nm. | Height of emission peak | Band width at ½ peak height, nm. |
|---|---|---|---|
| $SrMg_2(PO_4)_2:Eu^{+2}$ | 416 | 2.8 | 35 |
| $\alpha Sr_3(PO_4)_2:Eu^{+2}$ | 410 | 0.80 | 44 |
| $\beta Sr_3(PO_4)_2:Eu^{+2}$ | 423 | 0.14 | 50 |
| $Sr_3(PO_4)_2:Eu^{+2}$ | 423 | 0.39 | 40 |
| $Mg_3(PO_4)_2:Eu^{+2}*$ | 422 | 0.47 | 100 |
| Calcium tungstate | | | |

\* Thermally stabilized by small amount of cation, such as Al, Mg, Zn, Cd, Ca.

When the above europium activated phosphors are excited by 3650 A., the intensities of all are increased by about 10–20% in the same ratio but the position of the peaks do not change. Moreover, under electron bombardment by a cathode ray tube, emission from $$SrMg_2(PO_4)_2:Eu^{+2}$$

phosphors is a fairly good white-blue with an extremely long decay. In contrast thereto, that from $$\beta Sr_3(PO_4)_2:Eu^{+2}$$

is a dim pale green, with a long decay; from $$\alpha Sr_3(PO_4)_2:Eu^{+2}$$

the emission is a fairly deep blue but with a short decay, and from $Mg_3(PO_4)_2:Eu^{+2}$, fairly pink but also with a short decay.

From the above, it is apparent that the preferred $SrMg_2(PO_2)_2:Eu^{+2}$ phosphors have a distinctly different emission peak, half-peak-height width and intensity than $\alpha$ and $\beta Sr_3(PO_4)_2$, $Mg_3(PO_4)_2$ or standard blue-emitting calcium tungstate phosphor. Moreover, the distinct differences in half-peak-height values between the $$SrMg_2(PO_4)_2:Eu^{+2}$$

phosphor and the calcium tungstate phosphor are significantly important. For example, arc discharge lamps used in some photocopying processes require phosphors having a blue emission peak in the vicinity of 416 nm. with a sharp cutoff on either side of the peak. The narrow emission peak of the $SrMg_2(PO_4)_2:Eu^{+2}$ phosphor renders the phosphor eminently qualified for such specialized appliance.

Other characteristics of the novel phosphors of the present invention as well as manners of preparing same will be better understood by reference to the following example.

EXAMPLE I
[$Sr_{0.93}Mg_{2.06}(PO_4)_2:Eu_{0.1}^{+2}$]

| Ingredients | Mole ratio | Grams | Gram atoms | |
|---|---|---|---|---|
| | | | Cation | Anion |
| $SrHPO_4$ | 0.933 | 77.1 | 0.933 | 0.933 |
| $3MgCO_3 \cdot 1Mg(OH)_2 \cdot 3H_2O$ | 0.517 | 84.9 | 2.068 | |
| $(NH_4)_2HPO_4$ | 1.067 | 63.45 | | 1.067 |
| $Eu_2O_3$ | 0.05 | 7.92 | 0.100 | |

After accurately weighing out the above ingredients, the phosphor is prepared, as follows:

(1) Mix the ingredients for about 1 hour preferably under conditions of high shear, as in a mixer mill.

(2) Prefire the mixture for 2 hours in air at 800° C.

(3) Cool the fired material and grind for about 30 minutes.

(4) Fire the material in a reducing atmosphere for 2 hours at 1100° C. For example, fire the material in a silica tube with a 1% $H_2$-99% $N_2$ gas mixture flowing therethrough, at a rate of about 2 c.f.h.

(5) Cool the fired material to room temperature in a reducing or inert atmosphere. For example, continue the flow of the 1% $H_2$-99% $N_2$ gas mixture through the tube until the fired material is cool.

Before phosphors produced in accordance with the above-described procedures are employed in a particular application they are preferably reduced in size so as to pass through a 200 mesh screen. Also when the phosphors are employed in fluorescent lamp applications, they are usually washed with a dilute HCl solution and then with a dilute $NH_4OH$ solution. After drying, the phosphor can be employed in lamps in manners known to the art.

Various modifications in the composition shown in the above example can be made without appreciably detracting from the utility of the phosphor. For example, the emission peak shown in Table I for $$Sr_{0.93}Mg_{2.06}(PO_4)_2:Eu_{0.1}^{+2}$$

has a height of 2.8 and occurs at 416 nanometers; however the Sr can vary between about 0.25 and 1.75 and still yield a narrow band blue emission peak. For the composition $Sr_{0.25}Mg_{2.75}(PO_4)_2:Eu_{0.1}^{+2}$, the blue emission peak has a height of 1.59, which is higher than that of the other known phosphors shown in Table I. At Sr concentrations below about 0.25, the blue emission peak is drastically reduced and X-ray diffraction patterns of the material show that it is no longer only a strontium magnesium orthophosphate compound, but is a mixture thereof with magnesium phosphate. For the composition $$Sr_{1.75}Mg_{1.25}(PO_4)_2:Eu_{0.1}^{+2}$$

the blue emission peak has a height of 1.62. At Sr concentrations above about 1.75, the blue emission peak is drastically reduced; analysis shows the material to be, not a compound of strontium magnesium orthophosphate alone, but a mixture thereof with strontium phosphate.

As will be seen from Example I the stoichiometry of total cations to anions in the particular $$SrMg_2(PO_4)_2:Eu^{+2}$$

produced is 3.1:2. That is to say, the ratio of total gram atoms of cations to anions is 3.1:2. This ratio of total cations to anions can be varied somewhat but preferred properties are best obtained when the ratio of cations to anions is between about 2.8 to 3.2:2. Similarly, as will be seen from Example I, the concentration of Eu in the $SrMg_2(PO_4)_2:Eu^{+2}$ produced in the above-described procedure is about 0.02 mole percent per gram mole of europium activated strontium magnesium orthophosphate. The concentration of the europium activator in the present phosphors can also be varied if desired. However, the best balance of presently desired properties are obtained when the concentration of the activator Eu is between about 0.0004 mole percent to about 0.40 mole percent per gram mole of europium activated strontium magnesium orthophosphate.

Other modifications of incidental features set forth in the above example can be employed in the practice of the present invention. Such modifications include among others, the following: the prefiring temperature can vary from about 600° C. to about 1100° C.; the final firing temperature can vary from about 1000° C. to about 1100° C.; the time of prefiring can vary from 2 to about 5 hours; and the time for final firing can vary from about 1 to about 6 hours.

Various changes in the details and materials which have been described herein may be made by those skilled in the art within the principle and scope of the invention. It is my intention, however, to be limited only by the scope of the appended claims.

I claim:

1. A luinescent composition consisting essentially of a compound of divalent europium activated strontium magnesium orthophosphate wherein the ratio of magnesium atoms to strontium atoms is about 2 to 1.

2. The phosphor of claim 1 wherein the ratio of total cations to anions is between about 2.8:2 and 3.2:2.

3. The phosphor of claim 2 wherein the europium concentration is between about 0.0004 and 0.4 mole percent.

References Cited

UNITED STATES PATENTS

| 3,110,680 | 11/1963 | Koelmans et al. | 252—301.4P |
| 3,328,620 | 6/1967 | Rimbach | 252—301.4P |

OTHER REFERENCES

Chemical Abstracts, vol. 55, October 1961, p. 19,506e.

TOBIAS E. LEVOW, Primary Examiner

R. D. EDMONDS, Assistant Examiner